United States Patent [19]

Crouse et al.

[11] Patent Number: 4,899,384
[45] Date of Patent: Feb. 6, 1990

[54] TABLE CONTROLLED DYNAMIC BIT ALLOCATION IN A VARIABLE RATE SUB-BAND SPEECH CODER

[75] Inventors: William G. Crouse; Malcolm S. Ware, both of Raleigh, N.C.

[73] Assignee: IBM Corporation, Armonk, N.Y.

[21] Appl. No.: 900,113

[22] Filed: Aug. 25, 1986

[51] Int. Cl.$^4$ ............................ G10L 3/02; H04B 1/66
[52] U.S. Cl. ........................................ 381/31; 375/122
[58] Field of Search ..................... 381/29–32, 381/36–40, 41; 364/513.5; 375/122, 25–26, 34

[56] References Cited

U.S. PATENT DOCUMENTS

| | | | |
|---|---|---|---|
| 4,142,071 | 2/1979 | Croisier et al. | 381/29 |
| 4,191,858 | 3/1980 | Araseki | 381/31 |
| 4,216,354 | 8/1980 | Esteban et al. | 381/31 |
| 4,386,237 | 5/1983 | Virupaksha et al. | 381/31 |
| 4,455,649 | 6/1984 | Esteban et al. | 381/31 |
| 4,535,472 | 8/1985 | Tomcik | 381/31 |
| 4,538,234 | 8/1985 | Honda et al. | 364/513.5 |
| 4,713,776 | 12/1987 | Araseki | 375/122 |

FOREIGN PATENT DOCUMENTS 0176243  4/1986  European Pat. Off. .

OTHER PUBLICATIONS

Galand et al., "16 KBPS Real Time QMF Sub-Band Coding Implementation", IEEE ICASSP 80, pp. 332–335.
Esteban et al., "Application of Quadrature Mirror Filters to Split Band Voice Coding Schemes", IEEE ICASSP 77, pp. 191–195.

*Primary Examiner*—Gary V. Harkcom
*Assistant Examiner*—John A. Merecki
*Attorney, Agent, or Firm*—Edward H. Duffield

[57] ABSTRACT

A sub-band coder utilizes one or more bit allocation tables to dynamically distribute the channel bit capacity bandwidth among the frequency bands according to the desired output quality of speech rather than by means of complex algorithms or simulation techniques. Multiple bit assignment tables are provided to allow various quality levels to be traded off as increasing bit rate demands are placed upon the transmission system. The technique is used for a single coder to achieve a minimum bit rate for a desired given level of subjective quality in speech output or may be used in a shared bit resource to maintain equal and minimum quality degradation for all users. The quality tables determine the number of bits to be dropped from the encoded representation of each signal sample to minimize the transmission load for a given coder without sacrificing speech quality to an unacceptable degree. Table entries are arranged based on the overall band peak energy level and on the sub-band peak energy distribution or spectrum as it is known in the field.

8 Claims, 2 Drawing Sheets

FIG. 2

| SPECTURM BAND ENERGY BAND NUMBERS (BASE 7) | | | | | | | ABSOLUTE ENERGY LEVEL (00000 TO 11111 BASE 2) | | | | |
|---|---|---|---|---|---|---|---|---|---|---|---|
| 0 | | 1 | | 2 | | | | | | | |
| 0 | 1 | 2 | 3 | 4 | 5 | 6 | 00000 | 00001 | 00111 | 01000 | 11111 |
| 1 | 0 | 0 | 0 | 0 | 0 | 0 | (A,A,A,A) | | | (A,A,A,B).. | (A,A,A,D) |
| 2 | 0 | 0 | 0 | 0 | 0 | 0 | | | | | |
| 3 | 0 | 0 | 0 | 0 | 0 | 0 | (B,A,A,A) | | | (B,A,A,B).. | (B,A,A,D) |
| 4 | 0 | 0 | 0 | 0 | 0 | 0 | | | | | |
| 5 | 0 | 0 | 0 | 0 | 0 | 0 | (C,A,A,A) | | | (C,A,A,B).. | (C,A,A,D) |
| 6 | 0 | 0 | 0 | 0 | 0 | 0 | (D,A,A,A) | | | (D,A,A,B).. | (D,A,A,D) |
| 0 | 1 | 0 | 0 | 0 | 0 | 0 | (A,A,A,A) | | | | |
| 1 | 1 | 0 | 0 | 0 | 0 | 0 | | | | | |
| 4 | 6 | 2 | 1 | 3 | 1 | 0 | (D,A,B,A) | | | | |
| 6 | 4 | 6 | 6 | 6 | 6 | 6 | (D,D,D,A) | | | | |
| 0 | 5 | 6 | 6 | 6 | 6 | 6 | | | | | |
| 1 | 5 | 6 | 6 | 6 | 6 | 6 | | | | | |
| 2 | 5 | 6 | 6 | 6 | 6 | 6 | (C,D,D,A) | | | (C,D,D,B).. | (C,D,D,D) |
| 3 | 5 | 6 | 6 | 6 | 6 | 6 | | | | | |
| 4 | 5 | 6 | 6 | 6 | 6 | 6 | | | | | |
| 5 | 5 | 6 | 6 | 6 | 6 | 6 | | | | | |
| 6 | 5 | 6 | 6 | 6 | 6 | 6 | | | | | |
| 0 | 6 | 6 | 6 | 6 | 6 | 6 | | | | | |
| 1 | 6 | 6 | 6 | 6 | 6 | 6 | | | | | |
| 2 | 6 | 6 | 6 | 6 | 6 | 6 | (D,D,D,A) | | | (D,D,D,B).. | (D,D,D,D) |
| 3 | 6 | 6 | 6 | 6 | 6 | 6 | | | | | |
| 4 | 6 | 6 | 6 | 6 | 6 | 6 | | | | | |
| 5 | 6 | 6 | 6 | 6 | 6 | 6 | | | | | |
| 6 | 6 | 6 | 6 | 6 | 6 | 6 | | | | | |

BAND GROUP → (leftmost column)

TABLE CONTROLLED DYNAMIC BIT ALLOCATION IN A VARIABLE RATE SUB-BAND SPEECH CODER

FIELD OF THE INVENTION

This invention relates to digital to analog and analog to digital converters in general and more specifically to analog to digital speech sampling and encoding means for preparing one or more speech signal sources for transmission in a digital link for reconstruction by digital to analog converters at the receiver. It is particularly suited to multiple voice channel compression for transmission.

BACKGROUND OF THE INVENTION

Numerous sub-band speech coders are known as are speech coder systems based on digital microprocessors for handling the manipulation of the digital energy level samples normally occurring in such systems. Reference may be had to the 1977 IEEE International Conference on Acoustics, Speech and Signal Processing record of May 9-11, 1977, pages 191-195 and to the IEEE Acoustics, Speech and Signals Processing Society Proceedings of April 9-11, 1980, Vol. 1, pages 332-335 which show typical digital sub-band speech coder and decoder arrangements for multi-channel speech transmission use.

In systems like those in the above-referenced publications, the subjective quality of performance of sub-band speech coders perceived by a listener at the receiver is highly dependent upon the allocation of available bits in the transmission medium to the individual frequency bands in the sub-band coder. A major improvement previously made involved the use of dynamic bit allocation where the available bits are dynamically distributed among the frequency bands according to the energy present in each band sample. This technique was extended to a variable bit rate system where many speech coders could share a common bit rate resource, i.e., a transmission channel, by assigning bits to all the bands of all the coders according to the energy in each frequency band in its relationship to all other frequency bands.

The typical sub-band speech coder takes the 0 to 4 kilohertz speech spectrum and samples it, typically at a sampling rate of 8,000 samples per second. Through filtering and sub-sampling, the speech spectrum is divided into sub-spectra, typically into eight sub-bands of 500 Hertz width each. In such a system, depicted schematically in FIG. 1, incoming analog signals on analog line 1 are converted to digital sample stream by the analog to digital converter 2, samples of which are clocked out by the clock 4 over line 3, typically at an 8 kilohertz sampling rate to a parallel filter bank 5.

The filter bank 5 divides the incoming digital stream into typically 8 frequency sub-bands spanning the spectrum from 0 to 4000 hertz. The output is thus a series of eight individual channels each having samples occurring at the rate of 1000 samples per second as schematically shown by the clock 6 controlling the output of the filter bank 5 over lines 7.

Individual frequency sub-band peaks and the overall peaks are measured by the peak quantizer 9 which normalizes the signal samples within a time frame. Forward error correction and dynamic bit allocation are applied to the quantized samples by forward error correction generator 10 and by the dynamic bit allocation technique or algorithm normally practiced in a microprocessor as shown by the dynamic bit allocation section 11. The output of the filter bank 5 is then companded or normalized in level by compander 8 and quantized to the number of bits allocated by 11.

The output from the compander is typically a signal stream of approximately 13,000 bps and the forward error correction generator 10 generates an output stream of approximately 3000 bps including the peak quantizer data which presents a total data stream to the serializer 13 for transmission over the digital channel 14 of approximately 16,000 bps. This serial signal stream includes the actual companded signal samples plus a side channel of information that indicates the bit allocations provided for each frequency sub-band plus the forward error correction code.

Referring to FIG. 1 as the prior art, the 0 to 4 kilohertz input spectrum on line 1 is typically sampled at 8000 samples per second after it emerges from the A to D converter 2. This is shown by the sample clock 4 controlling the output on line 3 from the analog to digital converter 2. Filtering and sub-sampling are conducted in the parallel filter bank 5 which decimates the incoming series of samples in the total spectrum into sub-spectra, typically 8. In the example given, the 0 to 4 kilohertz input spectrum is decimated into 8 sub-bands of 500 Hertz width each. The first band is the 0 to 0.5 kilohertz band, the second is the 0.5 to 1 kilohertz band, etc. Each of the sub-bands individual time waveforms are represented by a 1000 sample per second bit stream at the output of the filter bank 5 as controlled by the clock 6. Numerous other bandwidths are sometimes used and 16 bands of 250 Hertz width each are not unusual. Occasionally non equal sub-band widths are employed.

The eight individual sub-band time waveforms are normally processed in time block lengths ranging from 4 to 32 milliseconds in a signal processor typically embodied as a microprocessor. The illustration in FIG. 1 assumes a 16 millisecond sample block time length. The peak quantizer 9 in FIG. 1 finds the peak magnitude of the signal in each sub-band within a given time block or series of samples. The individual sub-band frequency peaks are logarithmically quantized, typically to a degree of 2 to 4 dB of resolution.

The information is then passed to a dynamic bit allocation means and to a forward error correction coder which adds error protection. The result is then passed to serializer 13 which multiplexes the actual bits from the transmission stream of samples coming from the parallel filter bank 5. The bit allocation has been assigned at a reduced level by the bit allocation technique practiced in box 11. The reduction in bits is to the level occurring in the compander 8 which also multiplexes in the side channel information which informs the receiver of the specific bit allocation employed during this sample block of 16 milliseconds.

In FIG. 1, the dynamic bit allocation function 11 assigns available bandwidth bits for a given block of 16 milliseconds of time to individual frequency sub-bands normally at the rate of 1 bit for every 6 dB of peak signal.

A given frequency sub-band with twice the peak value of a second sub-band would get one more bit than the second. A band with four times the peak energy would get two more bits than the other sub-bands and so forth. In practice, this ideal assignment cannot be achieved since a fixed number of available bandwidth bits cannot be subdivided precisely in this manner among all the available sub-bands. The actual process performs an initial bit assignment which includes possibly some very large numbers including negative numbers and fractional numbers. These are then rounded to integers and limited to a minimum of 0 and a maximum of, perhaps, 5 bits. This usually results in the wrong total of bits required for assignment so that an iterative redistribution of bits is required. All of this is a highly time and hardware consumptive process which provides less than ideal accuracy.

The sample compander and quantizer 8 uses the quantized peak energy information to compand or normalize the time waveform in each band. It then quantizes each sample in each frequency sub-band with the number of bits that are assigned by the bit allocation technique for that frequency sub-band. All of the information used for companding and for the bit allocation is made available to the receiver or demodulator at the far end of the system so that it can reconstruct the original time waveforms and pass them through reconstructive digital to analog filters to approximate the original 0 to 4 kilohertz input signal. The receiver end is not shown in FIG. 1 but may be seen clearly in the IEEE International Conference on Acoustic Speech and Signal Processing, Vol. 1 cited above.

In this process, some degradation in speech quality will take place since the available bits, i.e., the bandwidth assigned for this coder on the transmission system may not be sufficient to precisely reconstruct the input signal in its original form.

The problems associated with this type of system are primarily those of bit allocation. The bit allocation technique described above tries to approximate the required functions and to achieve an optimum signal to noise ratio for a given allowed fixed number of bits or bandwidth provided to the coder. The first problem is that signal to noise ratio will be highly affected in each speech spectrum due to the fixed number of bits per second assigned. Flat spectra will have very few bits assigned in all of their sub-bands while sparse spectra will have many bits assigned to a few of the higher energy sub-bands and will thus yield high signal to noise ratios as compared with the low signal to noise ratio in the flat spectra. Secondly, it has been observed that humans do not hear noise in a signal proportional to the signal to noise ratio. Additionally, not all humans hear the same and do not hear according to any known equations or mathematical models. The output quality of a speech coder is evaluated by experts on its subjective equivalent signal to noise ratio based on their appreciation of the perceived quality of speech as it is reconstructed. Usually their estimate of the overall signal to noise ratio is dramatically different from the actual quantitative signal to noise ratio that exists.

Some partial solutions have been offered to these aforementioned problems. Allocating bits at a rate of less than 1 bit per 6 dB of input peak signal has helped. Non-linear quantizers have also helped. Variable bit rate assignment techniques can help if one can determine how to vary the bit rate assignment. All of these attempts amount to a guess at how humans actually perceive the quality of sound through hearing. All of these techniques use some formula that is convenient or easily implemented as opposed to whatever is truly needed.

OBJECTS OF THE INVENTION

In light of the foregoing known problems with sub-band speech coders, it is an object of the present invention to provide an improved method of reducing the total quantized band peak information into a finite and containable number of states that sufficiently represent both the level and spectrum of each time block of signals and to provide means for assigning the bit allocation to the sub-bands consistent with a desired objective overall voice quality output.

Yet another object of the present invention is to provide improved means for bit assignment utilizing the signal level and signal energy level distribution spectrum for each time block to access a table of bit assignments necessary for a given quality of speech output.

Yet another object of the present invention is to permit multiple bit assignment tables to be used to allow bit rate assignments to be traded for overall perceived speech quality output either to accommodate a decrease in the bit rate when more users are present or to provide higher quality service for one or more users than that provided to others for a given bit rate.

SUMMARY OF THE INVENTION

The solution to the foregoing problems which meets the mentioned objects of this invention may be set forth in its most general form as follows. The total quantized sub-band peak information is reduced into a finite and containable number of states that sufficiently represent both the absolute peak energy level and the spectral energy level distribution within the sub-bands during each time block of signals to be processed. The energy level and the spectral distribution represent a given permutation of signal states that can be used as addresses for table look-up. The tables that are accessed contain the required bit allocations for any desired subjective speech quality output. Table values are assigned based on subjective experimentation and multiple tables can be provided for different qualities of performance versus average bit rate throughput. Separate tables could also be provided for signals such as those for modems which require only an objective level of quality.

Processing slot time was chosen at 4 milliseconds with an 8 kilohertz sampling rate so that 32 samples will be produced by the split band filter during each 4 milliseconds. Four signal samples will be thus available for each sub-band and 8 sub-bands are assumed. The 4 millisecond time block was chosen to reduce the block processing delay and to minimize a round trip echo path for live telephone conversations. Longer blocks reduce the total amount of side channel bit rate information required but cause a greater echo delay which is of more concern.

A band peak for a block is determined by computing the magnitudes of the four samples in each sub-band and selecting the largest band peak occurring during the block in each sub-band. An overall block peak is also determined by finding the largest of the band peaks in the group of samples over the 4 millisecond block. The block peak is quantized to fall within one of thirty-two levels, each 2 dB apart, i.e., the block peak found is compared to a 32 level block peak energy scale and the given peak measurement for the block is identified at one of the levels. The peak measurement is then encoded as a 5 bit binary number which is the number of that level out of the 32 levels possible which has been found for the block peak. This 5 bit binary number is to be included in the side channel information for transmission to the demodulator to identify the overall scale of the maximum peak in this block of data.

The overall block peak or absolute maximum energy level in the block is then used to retrieve a multiplier or companding value to be used as a scale factor to compress all of the samples from the various frequency sub-bands to a normalized range. The companded samples are then quantized in a linear 6 bit quantizer and temporarily saved as quantized samples. The values of the samples will be 64 integers ranging from −32 to +31 and including 0. Six bits of information is more than needed to represent many of the samples and a reduction is made later.

The individual sub-band peak energies are also companded by the block peak scale, but they are then linearly quantized with twice the resolution as the individual samples. Band peaks are only positive numbers, i.e., magnitudes, so there will be only 64 levels possible. These are designated levels 0 through 63 with 63 being the largest level.

Considering the nature of binary numbers, it is obvious that the bands having peaks greater than 31 will require 6 bits of data to represent or describe the level at which that sample fell on the scale from 0 to 63. Those frequency sub-bands having peaks ranging on the level 16 to 31, however, will have their two high order bits the same and the sub-band frequency peaks lying in the range of 8 to 15 will have the three high order bits equal and so forth. Thus, a table can be made to be addressed quickly based on the individual band peak energy measured that will indicate how many of the original 6 bit of quantized sample information must be preserved to retain all of the original information contained in the sample. Band peak levels lying on levels 32 through 63 require 6 bits; band peak energy levels between 16 and 31 require 5 bits of the original 6 to be preserved, levels 8 through 15 require 4; levels 4 through 7 require 3; levels 2 and 3 require 2; level 1 requires only 1 bit and level 0 requires none.

The designation of the number of bits required can be encoded utilizing 3 bits since 3 bits can represent the numbers 0 through 7 which is more than sufficient to encode the required bit designations 0 through 6. This information is for the side channel of information to be passed to the decoder at the receiver. With eight frequency sub-bands, allowing 3 bits for each frequency sub-band to inform the receiver of how many bits in the sample stream must be allocated to encode the individual band peak levels, given 8 frequency sub-bands with 3 bits each, there will be 24 bits required in the side channel for telling the decoder or demodulator how many bits are required for each sample in each band. This is only an indication of where the high order bit of each sample will fall.

Further bit rate reduction which will detract from the quality but not to a detrimental degree will result based upon bit reductions applied uniformly to the sub-bands based upon the findings of the energy spectrum and absolute overall energy level in the time block sample. The bit rate reductions to be applied are contained in a quality table which will be described in greater detail later.

BRIEF DESCRIPTION OF THE DRAWINGS

FIG. 2 illustrates a truncated table showing schematically how the spectrum of energy levels in the individual sub-bands and the absolute energy level in the overall block of samples can be utilized as table addresses to address a table containing bit allocation states that define how many bits to be dropped from each signal sample.

DETAILED SPECIFICATION

Figure 1:
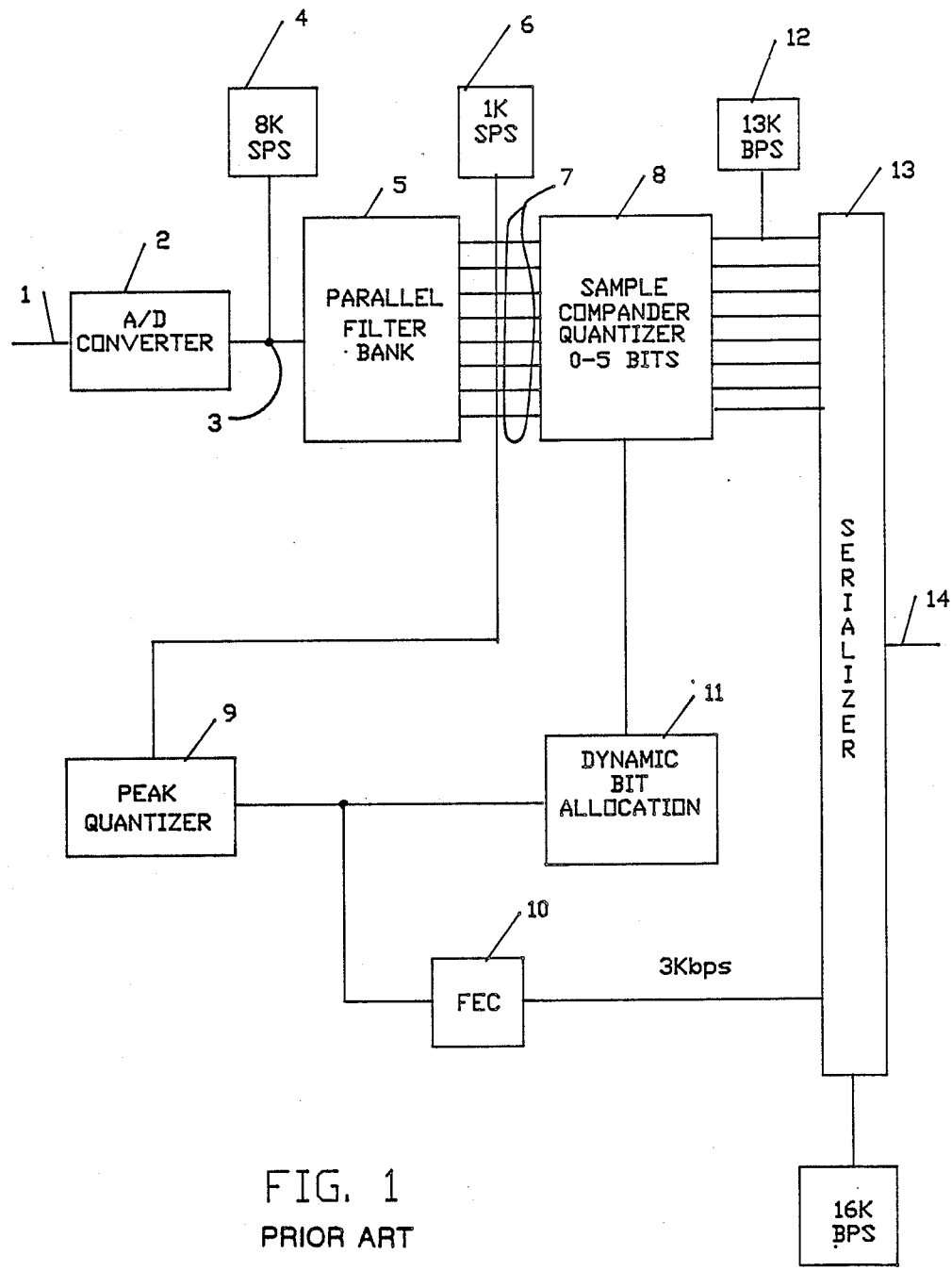
FIG. 1 illustrates a schematic prior art representation of a sub-band encoder that can utilize the bit allocation technique of the present invention.

As noted in the above summary, the coder as described therein can give nearly transparent speech quality for telephone service. The bit rate required will be excessively high, however, reaching over 50,000 bps during idle periods. To reduce this required bit rate, with very little subjective speech quality degradation, it is possible to totally drop the eight sub-band. However, it has been retained in the present implementation since it may be required to meet some international requirements. However, further bit rate reductions can be made based upon the overall spectrum and energy level of the individual sample blocks as will be described.

As described so far, the speech coder has within a block eight sub-bands according to frequency, each with something between 0 and 6 bits of data allocated to it to describe the block peak level lying in a range of 0 to 31 that can be encoded in 5 binary bits. Much of the time during normal speech conversation, there are many more bits present in the samples than are really necessary to preserve even the very high quality present. In most cases, some of the bits could be dropped, particularly the low order bits which represent only small analog output variations when the digital signal is reconstructed. The low order bits or at least some number of low order bits could be dropped while still preserving the overall general high level of quality of speech reconstruction. The conditions in which these bits could be dropped may be distinguished by the side channel information, i.e., from the block peak maximum and from the individual sub-band peak spectral distribution that shows the distribution of energy across the spectrum in the sample.

A table can be constructed with a unique address for each of the side channel state combinations with entries in the table arbitrarily established on a subjective basis set by the quality of acceptable output speech reconstruction desired. The table entries contain a number of bits to be dropped for each state condition. The full number of addresses would exceed twenty-six million, however, even if the eighth sub-band is dropped. With seven sub-bands alone and with each sub-band having up to six bits necessary to identify the energy level, there are 832,542 combinations in sub-band energy spectrum distributions possible with seven sub-bands of frequency. With an overall energy level spectrum in the block of 32 possible energy levels the total table size would be 26,353,344 entries. Such a table of entries would be cumbersome to say the least and a number of steps are taken to reduce the number of entries down to 148 possible combinations for the present implementation.

The table can be truncated by combining or grouping some of the frequency sub-bands together. Eight sub-bands or seven, are more than a sufficient number to provide a good indication of the overall characteristics of speech. Therefore, to reduce the size of the table and the consequent addressing problem, the eight sub-bands are grouped into three sub-band groups following somewhat the well-known articulation index. Band group 0 will contain the frequency sub-bands 0 and 1. Band group 2 will contain frequency sub-bands 2 and 3 and band group 3 will contain the remaining sub-bands 4, 5, 6 and 7. Each band group will be assigned the value of the largest bit allocation in its included bands.

Further reduction in the size of the table can be achieved by reducing the number of levels or bits to be assigned in each band group. The initial levels were 0 through 6 bits. These may be represented differently by grouping where any of the original levels 0, 1 and 2 can be called new level 0. The original levels 3 and 4 can be represented as 1 and original level 5 can be represented as 2 with original level 6 being represented by a 3. No bit allocations are being redefined at this time, only grouping of the information into more coarse segments is being carried out to reduce the number of states to be addressed in the table.

These reductions have created a situation in which only three band groups exist and each has only four possible levels. Assuming all combinations were possible, there would still be 64 states or permutations of this information. Only 37 states would have to be used if it is assumed that at least one band group will have 6 bits allocated with its assigned level of 3. At very low levels of energy it is possible that no sub-band would have all 6 bits allocated since the level of signal would fall below the companding level. In this case, accuracy would not be very critical so it is assumed that the level in band group 2 is at a level of 3 to thus maintain the use of only 37 different permutations out of the original 64 mentioned above. These 37 states can be utilized as table addresses based on spectra since they represent, in a condensed form, an indication of the peak level distribution among the original seven or eight frequency sub-bands, i.e., the spectrum of energy in the original block of samples.

A quality table constructed utilizing these 37 states as spectrum addresses is of limited size and is of importance since human hearing is based on the spectral distribution of energy in the signal heard. However, there still remain 32 levels possible for the block peak. If all of these levels were preserved and we would have 37 times 32 addresses in each quality table for a total of 1184 addresses. The level is significant in the human subjective speech perception quality only to the extent that human hearing has a limited range. This means that perception of distortion is less at lower sound levels. In the present specific implementation, the 32 levels can be subdivided into only four general ranges. These can be subjectively selected through a level table. Dropping the least significant bit of the 5 bit block peak reduced its range to only 16 levels with 4 dB separation. The remaining 4 bit binary number can be used as an address to a 16 address table containing only the numbers 0, 37, 74 and 111.

To obtain the complete address, a level address is found using the block peak that was measured, i.e., the 5 bit block peak with its least significant bit dropped is a 4 bit number that can be correlated to one of the four ranges noted above. This portion of the address plus the spectrum address generated as pointed out earlier can be the quality table address entry pointer. The quality table itself would then have 37×4 total stored values, or 148 address locations. The quality table will contain a value representing the number of bits to be dropped from each sample actually coming from the parallel filter bank. The number of bits to be dropped is ideally identified through preference testing with a group of human subjects. Each address or selected groupings of addresses can have the drop bit number varied while human subjects listen to phrases of speech encoded utilizing the technique of this invention. Alternatively, each address could hold 8 unique drop bit numbers, each corresponding to each of the 8 sub-bands. By comparing the subjective opinions of the listeners, each given address can have the drop bits maximized while maintaining at least a desired level of quality. Multiple tables of 148 addresses can easily be generated each with a different quality level. Four tables is a sufficient number to cover a reasonable range of near transparency in which no distortion is perceptible to a minimum acceptable quality that would require only a minimum bit rate.

In this fashion, the quality table supplies a solution to the complex problem of how a human auditory nerve and brain interact to define a listener's subjective evaluation of the coded speech performance. Previous solutions have been based upon definitions that use some fixed equation to optimize a few parameters including signal to noise ratio. Instead of assuming a simplistic fixed equation, the quality table approach allows a large group of listeners to define how bits should be removed from speech blocks to optimize the subjective desires of speech quality in the group. The quality table is thus a statistically defined speech coder and the definition for resolution provided is based upon the subjective results of a large body of listeners selecting the preference between two different quality tables.

FIG. 2 illustrates schematically the table approach and shows how it can be truncated from all possible combinations that result from 7 sub-bands in the range 0 to 3500 hertz, the remainder from 3500 to 4000 being dropped for this example, and 32 absolute block peak energy levels. Each table is addressed by the 7 sub-band energy level numbers found in the sub-band peak energy determining phase. The other entry is the overall absolute energy level which falls within one of 32 levels previously noted.

The entire table may be condensed to a table of 148 entries following the observance of the following rules. Step 1: the maximum of the sub-band numbers 0 and 1 is called band group 0. The maximum value of the sub-band peak numbers in sub-bands 2 and 3 is called band group 1. The maximum of the band numbers 4, 5 and 6 is called band group 2. The coarse groupings noted above are implemented in this table given a raw spectral distribution as follows for the energy peak levels in the sub-bands. Energy peaks might be represented as 4, 6, 2, 1, 3, 1 and 0 for the energy sub-bands 0 through 6 and the absolute block peak energy level might be decimal 4 or 00100 in binary. Assuming the rule of grouping the sub-bands together, four arbitrary states A, B, C or D exist for each band group and are assigned as follows. State A if band group 0 is 0, 1 or 2; state B if band group 0 is 3 or 4; state C if the level of band group 0 is 5 and state D if the level of band group 0 is 6. The same is true for the other band groups 1 and 2. It will be recalled that band group 0 comprises the measurements from the energy sub-band peaks 0 and 1, that band group 1 comprises the energy peaks from frequency sub-bands 2 and 3 and band group 2 comprises the energy peaks from frequency sub-bands 4, 5 and 6.

The absolute energy level also can occupy several different states which were reduced to 4 states instead of 32 by a grouping as outlined earlier. Values of absolute energy level from 0 through 7 are assigned to state A. State B comprises the level 8 through 15; state C comprises the absolute energy levels from 16 through 23 and state D comprises the energy levels 24 through 31.

Returning to the example begun above where a raw spectral distribution of 4, 6, 2, 1, 3, 1, 0 with an absolute energy level peak in the block as 4 being found, then the unique energy state defined in table 2 will be: Band group 0, which is the maximum of 4 and 6, will equal 6 and corresponds to state D. Band group 1, having a maximum of 2 and 1 will be 2 which corresponds to state A. Band group 2 having the maximum of 3, 1 and 0 will be 3 which corresponds to state B. The absolute energy level which is 4 corresponds to state A. Thus, the final location within the table is that defined by the coordinates DABA. It will be noted that numerous spectral band number permutations and numerous energy level permutations are thus grouped together within a single region in the table and any specific entry based on a permutation of the seven energy sub-band peak level measurements and the absolute energy level measurement in the overall block will fall within a given range and be given the same value within the table. The content at the addressed portions of the table will be an arbitrary number of bits, say 0, 1, 2 or 3 which are to be dropped from the samples to be transmitted.

For the highest quality speech transmission, the high quality table indices would be loaded with many 0 content locations indicating that no bits are to be dropped from the samples assuming that the original signal samples are the usual 16 bit 2's complement samples. For each of the four signal samples in each of the frequency sub-bands, it is possible to greatly reduce the overall transmission channel loading by dropping the least significant bits and indicating to the receiver how many of the least significant bits have been dropped from each sample during a given block transmission period. Two or three bits being dropped from each sample may create little or no noticeable distortion in the final received and reconstructed signal but deleting even one of the high order bits will produce serious distortion. The level of distortion that is acceptable is a subjective criteria based on the acceptability of the overall perceived signal to the human subject. A typical quality table of minimum acceptable resolution would require deletion of 0 to 6 bits from each sample while the highest quality table possible would dictate 0 bit deletion from each sample.

It may be seen that quality tables may be established for any range of quality possible from the highest to the lowest acceptable quality level. It is equally clear that operation on a specific voice line to a specific user might be dictated as being accorded a high level of quality for priority communications but only a very low objective level of quality would be provided for machines such as a modem over the same line. The only difference in construction would be that different quality performance tables would be utilized depending on the nature of the input. A user wishing to acquire service over such a communication system might opt for high quality, high signal to noise transmission and be assigned a performance quality table with little or no bit deletion at a relatively higher price since proportionately more of the total channel bandwidth will be utilized in supplying high quality service and the consequent number of bits required to generate the high quality will occupy more of the channel space. Similarly, the user might request the least expensive or least proportionate amount of channel bandwidth for use by a modem. Indeed, the range of possible services and qualities thereof is virtually limitless if one assumes the full possible range that these quality tables can assume.

A more usual scenario would be that the system such as shown in FIG. 1 would implement the highest quality service for all users consistent with the total demand placed on the system by the number of users present given the channel bandwidth available to the system. Should either the channel bandwidth become restricted or reduced or the number of users increased, resort to lower quality transmission tables, i.e., assignment of fewer bits to each user can be easily accommodated by switching to a different speech quality table for the next and any ensuing sample blocks until either the user demand decreases or channel capacity is increased.

Examples of quality tables are empirically determined as noted above. Two examples follow, one for a moderate degree of quality and one for a low quality. Spectrum addresses for the table are generated as stated previously to generate one of 37 possible states. A simple rule for address generation is: If band group 0 has a band group level value of less than 3 and band group 1 has a level value less than 3 then the spectrum address will be three times the band group 0 level plus the band group 1 level which will generate spectrum addresses 0 through 8. If band group 0 has a level less than 3 and band group 1 is a level of 3, then the spectrum address will be four times the band group 0 level plus the band group 2 level plus 9 which will generate spectrum addresses from 9 to 20. And if the band group 0 level equals 3, then the spectrum address will be four times band group 1 level plus the band group 2 level plus 21 which will generate the spectrum addresses from 21 to 36.

The other entry to the table is from among the 32 levels of the block peak that were possible. The 32 levels were condensed to 4 ranges by dropping the least significant bit of the 5 bit block peak level which reduces its range to only 16 levels of 4 dB separation each. The remaining 4 bit number is used to address a 16 address table containing only the numbers 0, 37, 74 and 111 as noted earlier. The actual extent between the dividing points in the table between the values 0, 37, 74 and 111 is determined empirically by letting users perceive the result and select the most acceptable perceived quality. However, it may be observed that with high energy levels, the overall perceived quality is highly subject to signal to noise ratio distortion and that at very low levels the signal to noise ratio is not very important in a perceived quality of speech. Thus, dividing the four possible ranges equally among the possibilities would assign a higher degree of quality to very low level signals than is necessary. Consequently, in the example given, only two of the sixteen possible addresses are assigned to the lowest energy states, three to the next lowest, five to the next and six to the last or highest energy level range. Thus, in the specific implementation proposed herein, instead of utilizing the full 32 levels that are possible for the absolute energy level peak, the 32 levels are divided into only 4 ranges and the ranges in which a given absolute energy level measurement falls will dictate a range of table values to be accessed.

As a review of the overall coding process, the steps are as follows. First, the incoming signal samples are divided into blocks. In our example, all the samples occurring within a 4 millisecond period are a block. The peak within the block, i.e., the peak magnitude of all 32 signal samples in the 8 sub-bands with 4 signal samples per sub-band is found. Thirty-two logarithmic sized segments are established for the range of the block peak. The segment in which the given block peak is found is encoded as a 5 bit binary number representing the segment among the 32 in which it was found. Next, a signal sample range is found lying within the upper bound of the block peak segment that has been identified for the given block peak. Sixty-four linear sub-segments are defined for the range in which the block peak lies and then a specific sub-segment in which a given signal sample lies is defined by a 6 bit 2's complement binary number to identify, within the range of the peak, which level is occupied by a specific signal sample. The individual frequency sub-band peak magnitudes for each sub-band are found and are represented as a specific sub-segment of the 64 possible values by their 6 bit 2's complement binary number. The side channel information is then transmitted having a fixed 29 bits with the following format:

Five bits binary (to encode the overall block peak segment number within the 32 possible segments) followed by three bits for each of the eight frequency sub-bands (24 bits binary total) indicating the segment within the 64 possible segments of the identified block peak level segment in which the individual frequency sub-band peak were found. Recall, as stated above, that only 3 binary bits are utilized to identify how many of the six possible bits are required to represent the peak in each frequency sub-band. That is, 0 through 6 bits may be required to encode, in binary, the level from among the 64 possible levels occupied by the given sub-band peak sample but only 3 bits in binary will be required to convey to the receiver which number, whether 0 through 6 bits, has been assigned for the peak within that sub-band.

Following transmission of the side channel information in the format given above, the main channel information, i.e., the individual signal samples (all 32 of them) are transmitted. The number of bits used to represent each sample is truncated according to the value found in the table being utilized in accordance with this invention. In a gross simplification, if the minimum acceptable quality is being afforded, it may dictate that each of the signal samples transmitted may have its X lowest bits dropped where X is the value found in the table associated with the lowest acceptable quality of service. In actuality, the number of bits dropped will be different every 4 milliseconds. The various qualities simply result in different average number of bits dropped.

The entire process is repeated for the next signal block of 4 milliseconds of samples as will be readily understood.

Having thus described our invention with reference to a preferred specific embodiment thereof, it will be apparent to those of skill in the art that numerous departures from the specific implementation shown may be undertaken without departing from the basic concepts of utilizing a quality assignment table scheme for assigning encoding bits to the individual users in a sub-band coder system. Therefore, what is defined in the following claims as meant by way of illustration and not of limitation.

What is claimed is:

1. In a sub-band speech coder system having means for sampling input speech signals, means for converting the input speech signal samples to digital sample values, means for subdividing said digital sample values into spectral frequency sub-bands and means for transmitting normalized and compacted values of said speech signal samples together with encoded indicia descriptive of the normalization and compaction used to a remote receiver, an improved method of bit allocation for compacted input signal sample data comprising steps of:

sampling the input speech signals and converting the resulting samples to digital data samples;

dividing the sampled input signals into time blocks of digital data samples;

measuring the block peak energy level of said digital data samples in each said time block of digital data samples;

measuring the individual sub-band peak energy levels in each said spectral frequency sub-band in said digital data samples;

deleting a variable number of bits from each of said digital data samples in said time block in accordance with the values of said block peak energy level and of said sub-band peak energy level measurements and the spectral distribution of said sub-band peak energy levels in said time block, thereby allocating a variable total number of bits for each said time block.

2. A method as described in claim 1, wherein said deleting of bits in accordance with said values of said block peak energy level measurement and of said sub-band peak energy level measurements and the spectral distribution of said sub-band peak energy levels is accomplished by:

accessing a stored table of values representing the number of bits to be deleted from each digital data sample in said time block, said accessing being accomplished by addressing said table of values using representations of said peak energy measurements, and deleting the number of bits found in said table from each said digital data sample.

3. A method as described in claim 1 or 2, wherein:
said deletion of bits is performed on the least significant bits in each of said digital data samples.

4. A method as described in 2, wherein multiple tables of said values are included and further including a step of:

selectively accessing only one of said tables during a said time block, said accessed table being selected in accordance with whether higher or lower quality of speech representation is desired.

5. A method as described in 2 wherein multiple tables of said values are included and further including a step of:

selectively accessing only one of said tables during a said time block, said accessed table being selected in accordance with the currently available bit transmission bandwidth and the current total data traffic transmission demand in said system.

6. An improved sub-band speech coder apparatus having means for sampling input analog speech signals, means for converting the input analog signal samples to digital data sample values, means for subdividing the input signal frequency spectrum samples into frequency sub-bands and means for transmitting normalized and compacted values of said speech signal samples together with encoded indicia representing and describing the normalization and compaction used on said speech signal samples, further comprising:

means for dividing the sample digital data signals into time blocks each containing an equal number of samples;

means for measuring the block peak energy sample occurring in each said time block of digital data signal samples;

means for measuring the individual frequency sub-band peak energy levels in each said time block of digital data signal samples;

means for deleting a variable number of bits from each said digital data signal sample in said time block in accordance with the values of said block peak energy and of said sub-band peak energy level measurements and the spectral distribution of said sub-band peak energy levels in said time block.

7. Apparatus as described in claim 6, wherein:

said means for deleting bits from each of said digital data signal samples comprises at least one stored table of values representing the number of bits to be deleted, said values being arranged in said table in accordance with the values of said peak energy measurements.

8. Apparatus as described in 7, wherein:

said stored table of values contains a plurality of sets of values, only one of which may be selected during transmission of a given time block of said digital data signal samples, said sets of values being arranged to provide varying degrees of accuracy of speech analog signal representation.

* * * * *